No. 766,126. PATENTED JULY 26, 1904.
L. L. WILSON.
BEET HARVESTING MACHINE.
APPLICATION FILED NOV. 17, 1902.
NO MODEL. 2 SHEETS—SHEET 1.
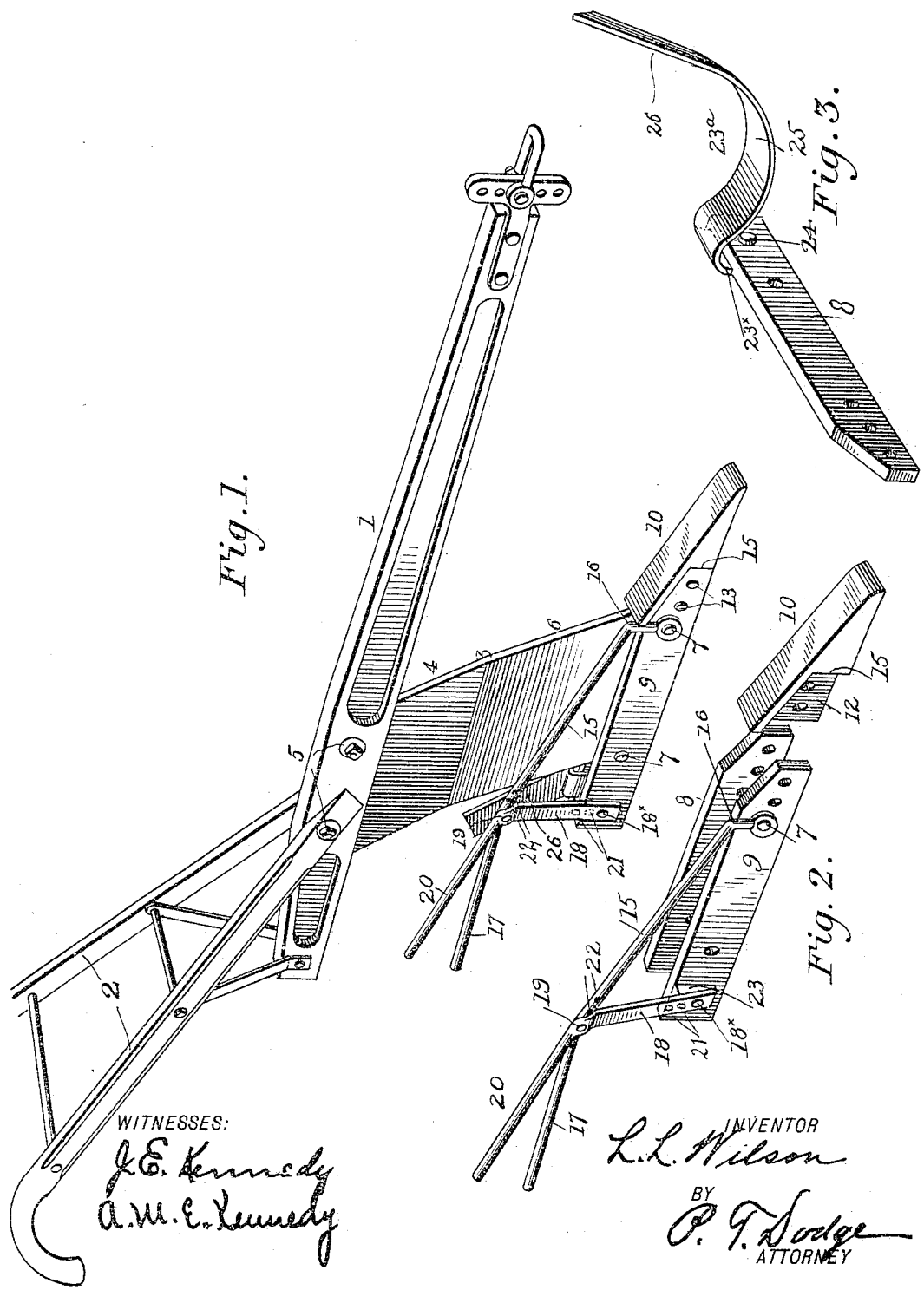

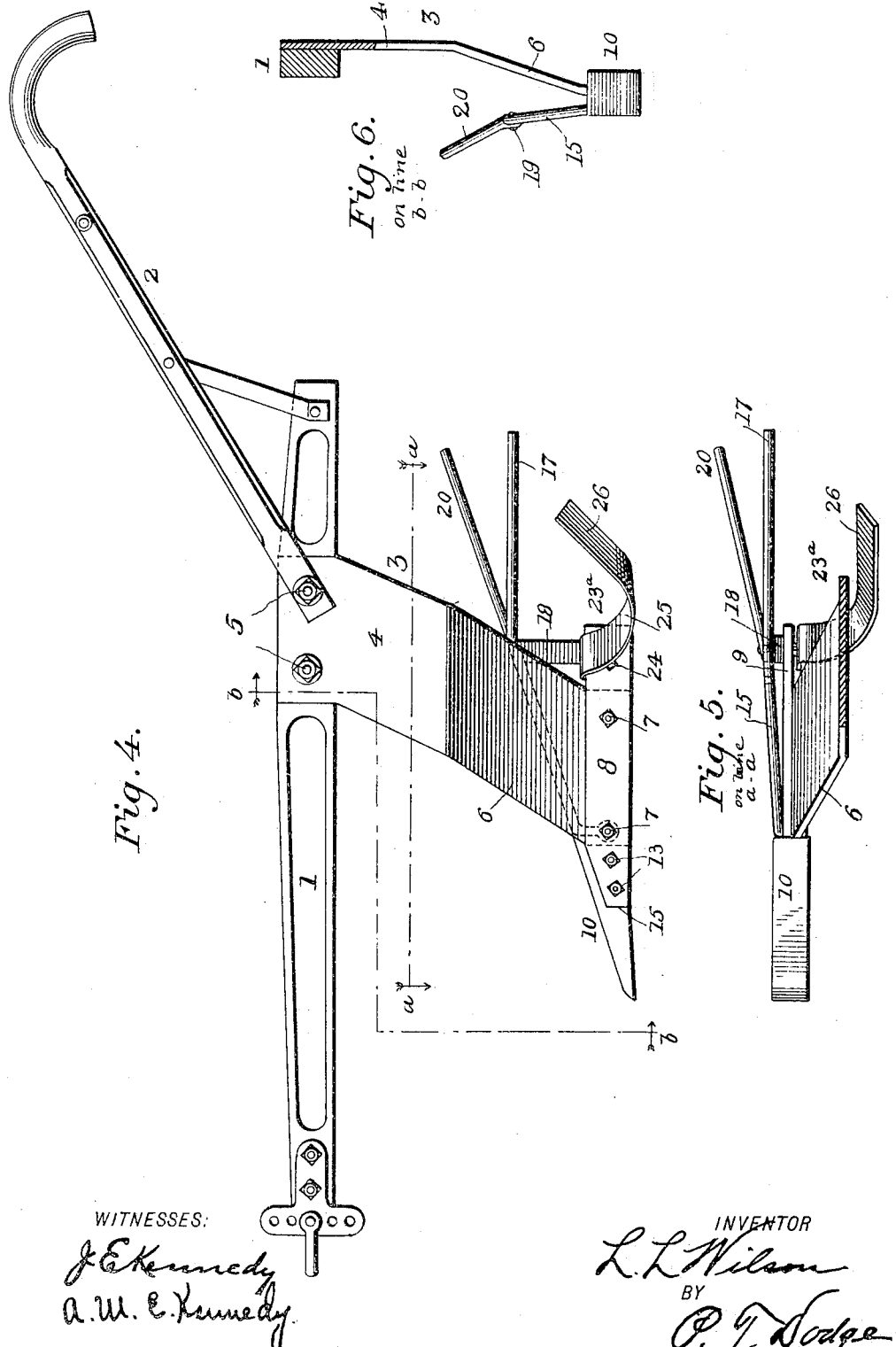

No. 766,126. Patented July 26, 1904.

UNITED STATES PATENT OFFICE.

LEVI L. WILSON, OF VASSAR, MICHIGAN.

BEET-HARVESTING MACHINE.

SPECIFICATION forming part of Letters Patent No. 766,126, dated July 26, 1904.

Application filed November 17, 1902. Serial No. 131,755. (No model.)

*To all whom it may concern:*

Be it known that I, LEVI L. WILSON, a citizen of the United States, residing at Vassar, in the county of Tuscola and State of Michigan, have invented a new and useful Improvement in Beet-Digging Machines, of which the following is a specification.

This invention has reference to machines for uprooting vegetables, and is designed more particularly for digging beets, the machine being constructed on the general lines of a plow provided with a colter adapted to cut through the soil and formed with devices acting beneath the surface of the soil to positively raise the beets from the ground as the plow is drawn through the field.

The invention consists, mainly, in combination with means for raising or lifting the beets, of means for filling in the earth under the raised beets, so that they will be prevented from settling back after the passage of the machine.

The invention also consists in various improvements directed more particularly to the form of the colter and the devices for raising the beets, having in view simplicity of construction, effectiveness in operation, and variations in the height to which the beet is raised to meet the varying conditions encountered in practice.

Referring to the drawings, Figure 1 is a perspective view of my improved machine. Fig. 2 is a perspective view of parts of the same separated to more clearly show their construction. Fig. 3 is a perspective view of the device for filling in the soil under the raised beets. Fig. 4 is a side elevation of the machine as viewed from the side opposite that shown in Fig. 1. Fig. 5 is a horizontal sectional plan view on the line *a a* of the preceding figure. Fig. 6 is a vertical transverse sectional elevation on the line *b b* of Fig. 4.

In the accompanying drawings, 1 represents a plow-beam provided with handles 2, which parts may be of the usual and well-known construction.

3 represents a colter in the form of a thin flat plate, which I designate the "land-side" colter, the function of which is to cut through the soil and loosen the soil adjacent to the beets to be raised. This colter has its front edge sloping forward and downward, with its upper portion perpendicular, as at 4, and secured firmly to the side of the beam by bolt 5 or other suitable means and its lower portion, 6, that entering the ground, inclined laterally furrowward, so that it will extend parallel with the sloping side of the beet, whereby the lifting devices presently to be described may be presented to the beet in the most favorable and effective position for action. To the base or lower edge of the colter are firmly attached, by means of bolts 7, a base-plate 8 on the land side and a base-plate 9 on the furrow side. At their front ends these base-plates extend beyond the colter and give support to a plow-point 10, formed with an upper inclined face, a vertical central rib 12 on its rear under side, which extends between the forward ends of the base-plates and which is firmly secured between them by bolts 13, and vertical shoulders 15 about midway between the ends of the "point," which shoulders abut against the front ends of the base-plates, as shown in Fig. 1.

Extending at the furrow side of the colter is a rod 15, the function of which is to raise the beets, and for convenience of description I term this the "lifting-rod." It has its front end extended downward, forming a shoulder 16, and its extremity is flattened and secured to the base-plate 9, near the forward end of the same, by the bolt 7 in such manner that it will have a limited pivotal adjustment on this bolt for the purpose presently to be described.

The shoulder 16 stands at the rear end of the plow-point, and from this point the rod extends rearward and at an outward and upward inclination, forming a continuation of the upper inclined face of the point, so that when the point is presented beneath the beet and advanced the rod will impinge against the side of the beet, and owing to its upward and outward inclination it will maintain contact with the same as it forces the beet gradually upward, the inclination or slope of the lower portion of the colter admitting of the presentation of the point and rod in the most favorable position for effective action. The rod extends at an upward inclination a sufficient distance to raise the beets to or near the surface, which in the present instance is at about the rear edge of the colter, and from this point the rod is deflected and extends horizontally and longitudinally, as at 17, forming an extension whose function is to hold the beets raised while the soil is being filled in under them by means presently to be described.

The rear end of the lifting-rod is given support by means of a brace 18, connected at its lower end with the rear extended end of the base-plate 9 by a bolt 18×, from which point it extends upward vertically to the lifting-rod, to which it is connected by a bolt 19, from which point the brace is continued rearwardly, upwardly, and outwardly, forming an extension 20, which for convenience of description I term a "clearing-rod," lying above and outward of the extension 17 of the lifting-rod and having the function, when properly adjusted, of deflecting or pushing the raised beets to one side and of assisting in holding them raised while the soil is being filled in under them.

The connection of the lower end of the brace 18 with the rear end of the base-plate 9 is such that the brace may be adjusted vertically for the purpose of giving the lifting-rod a greater or less degree of inclination to vary the height to which the beet will be raised, whether just at the surface of the soil or well on top of the same. This adjustment may be conveniently effected by providing the lower end of the brace or the end of the base-plate 9 with a number of holes 21, one above the other, to receive the fastening-bolt. As a result of this construction the inclination of the lifting-rod may be increased or diminished without varying the inclination of the extension 20 of the brace. The connection of this brace with the lifting-rod is adjustable in a direction longitudinally of the same, so as to vary the inclination of the clearing-rod simultaneously with the variation of the inclination of the lifting-rod, which is effected by providing the lifting-rod with a number of holes 22 at intervals on its length, the change of the bolt 19 from one to the other of these holes acting to shift both the lifting-rod and brace on their respective fastening-bolts 7 and 18× and in this manner changing both the inclination of the lifting-rod and the extension 20 of the brace. Also the "spread" of the parts or their distance from the land-side colter may be varied by providing a wedge 23, Fig. 2, which is set in between the lower end of the brace and the base-plate, to which it is connected. These various adjustments of the parts are found desirable in the practical operation of the machine. For instance, if it is desired to leave the beets standing loosely in the narrow ridge of the loosened soil, well up in sight, but protected from drying or freezing, the parts are adjusted with the lifting-rod low and the clearing-rod close to it, which is accomplished by lowering the brace on the base-plate and connecting it with the clearing-rod nearer the rear end of the latter. If, on the other hand, it is desired to raise and leave the beets well on top of the ground and exposed, the lifting-rod is raised by setting the brace higher up on the base-plate, and the parts are given more spread by the insertion of a wedge 22.

The filling in of the earth under the raised beets, as before alluded to, is effected by a device which I designate a "filling-colter," the action of which is to crowd or push the soil into the cavity or opening left under the raised beets while they are held up by the lifting-rod. To effect this result, I prefer to adopt the construction shown, which I have found to answer admirably the purpose in view.

Referring particularly to Figs. 3, 4, and 5, it will be seen that this device comprises a flat plate 23ª, extending vertically at its inner end, as at 23×, where it is secured between the rear extended ends of the base-plates by a bolt 24, and from this point the plate is curved landward, forming a horizontal portion 25, whence it extends upward and rearward, the rear edge of the upwardly-extending portion standing nearer to the plane of the colter than the front edge, the effect of which is to form surface 26, diverging from its rear edge forward, which surface as the machine advances forces the soil laterally toward and into the cavity left by the raised beets. This colter acts beneath the soil, the front edge cutting through the soil, while the inclined face acts against the loosened soil and forces it or crowds it to the side, filling up the cavity under the raised beets and effectually preventing them from settling back after the passage of the machine.

Having described my invention, what I claim is—

1. In a beet-digging machine, the combination with means for lifting the beets, of means acting independently of the lifting means for positively filling in the soil under the raised beets.

2. In a beet-digging machine the combination with means for lifting the beets, of means in the rear of the lifting means and acting wholly independently thereof for positively crowding the soil under the raised beets.

3. In a beet-digging machine the combination with means for lifting the beets, of means for temporarily holding them raised, and means acting independently of the lifting means for positively filling in the soil under the beets while being held temporarily.

4. In a beet-digging machine the combina tion with means for lifting the beets, of means acting at the side of the raised beets and independently of the lifting means for positively pushing the soil laterally beneath the raised beets.

5. In a beet-digging machine the combination with means for lifting the beets, of means acting independently of the lifting means at the side and in the rear of the raised beets for positively pushing the soil laterally beneath them.

6. In a beet-digging machine, the combination with means for lifting the beets, of a filling-colter disposed on the inner side of the lifting means and provided with an active surface sloping forward and outward with reference to the lifting means; whereby the colter will act as the machine advances, to push the soil beneath the beets.

7. In a beet-digging machine, the combination with a land-side colter, of lifting devices connected therewith, and a filling-colter also connected with the land-side colter at or near its base, and formed with an active surface disposed with reference to the lifting means, to push the dirt under the raised beets.

8. In a beet-digging machine, the combination with a land-side colter, of base-plates attached to its lower edge, lifting devices sustained by the base-plates, and a filling-colter also sustained by the base-plates and in rear of the land-side colter.

9. In a beet-digging machine, and in combination with a land-side colter and lifting devices, a filling-colter connected near the base of the land-side colter, and comprising a plate extending upward and rearwardly.

10. In a beet-digging machine and in combination with a land-side colter and lifting devices, a filling-colter comprising a plate fixed at its inner end near the base of the colter and extending thence outward, upward and rearwardly with its front upwardly-extending edge turned diagonally from the plane of the colter land side.

11. In a beet-digging machine, the combination with the beam, of a land-side colter having its lower portion inclined laterally furrowward with respect to the beam, so that when the colter enters the ground it will lie closely to and parallel with the inclined side of the beet-root, and beet-lifting devices at the lower end of the inclined portion of the colter on the furrow side, said beet-lifting devices acting independently of the colter to raise the beet.

12. In a beet-digging machine the combination of means for lifting the beets and forcing them laterally and means acting independently of the lifting means for filling dirt laterally in the direction of movement of the beets inward beneath the raised beets.

13. In a beet-digging machine the combination of means for lifting the beets and forcing them laterally and means in rear of the direction of lateral movement of the beets for positively filling dirt beneath the latter.

14. In a beet-digging machine the combination of means for lifting the beets and forcing them furrowward and means disposed on the land side of the machine for positively filling dirt beneath the raised beets.

15. In a beet-digging machine the combination of means disposed on one side of the machine for lifting the beets and means on the opposite side of the machine acting independently of the lifting means for filling dirt beneath the raised beets.

16. In a beet-digging machine the combination with means for lifting the beets, of independently-acting means for filling dirt beneath the raised beets, said two means being disposed relatively to each other to act on the same side of the row of beets being harvested.

17. In a beet-digging machine the combination of means for lifting the beets and a device disposed wholly in rear of the lifting means for filling soil beneath the raised beets.

18. In a beet-digging machine the combination of a colter, a base-plate on its lower end, a plow-point connected with the forward end of the base-plate with its upper face inclined upwardly and rearwardly, and a lifting-rod inclined upwardly and rearwardly and forming a continuation of the upper face of the plow-point, said rod having its front end turned downwardly to form a shoulder seated behind the plow-point and secured to the base-plate.

19. In a beet-digging machine, the combination with a land-side colter, of a beet-lifting member disposed on one side thereof and a device upon the opposite side of the colter for filling dirt beneath the raised beets.

20. In a beet-digging machine the combination with a land-side colter, of a beet-lifting member carried on one side thereof and a filling-colter on the other side of the land-side colter.

21. In a beet-digging machine, the combination with a landside-colter, of beet-lifting means carried on one side thereof and a device on the opposite side of the colter for filling dirt beneath the raised beets.

22. In a beet-digging machine, the combination with a land-side colter of beet-lifting means upon the furrow side thereof and means on the land side of the colter for filling dirt beneath the raised beets.

23. In a beet-digging machine and in combination with a beam, a land-side colter, a lifting-rod attached at its front to the base of the colter near its forward end, an upright brace connected at its lower end to the base of the colter, and means for connecting the upper end of the brace with the lifting-rod at different points in the length of the latter.

24. In a beet-digging machine the combination with a land-side colter, of a lifting-rod extending rearwardly and upwardly for some distance, and then horizontally in rear of the colter.

25. In a beet-digging machine the combination with the beam, of a land-side colter, and a lifting-rod extending rearwardly and upwardly and means for adjusting said rod to and from the colter.

26. In a beet-digging machine, the combination with the beam, of a land-side colter, a lifting-rod extending at the side of the same upwardly and rearwardly, a brace connected with the base of the colter and adjustable bodily vertically, means for connecting said brace at different points in the length of the lifting-rod, and an extension on the brace extending outwardly.

27. In a beet-digging machine the combination with the beam, of a land-side colter, a lifting-rod extending at the side of the same upwardly, rearwardly outwardly and finally in a horizontal direction longitudinally, and a clearing-rod extending above the longitudinal portion of the lifting-rod.

28. In a beet-digging machine and in combination with the beam, a land-side colter, a lifting-rod extending at the side of the same upwardly and rearwardly, a clearing-rod extending rearwardly beyond the colter and means for adjusting said clearing-rod and lifting-rod to and from the colter.

29. In a beet-digging machine, the combination with a land-side colter, of a lifting-rod extending upwardly and rearwardly and a clearing-rod extending outwardly to deflect the raised beet.

30. In a beet-digging machine, the combination with a land-side colter, of a lifting-rod extending rearwardly, upwardly and finally in a horizontal direction longitudinally, and a clearing-rod extending above the horizontal portion of the lifting-rod, outwardly and rearwardly.

In testimony whereof I have signed my name to this specification in the presence of two subscribing witnesses.

LEVI L. WILSON.

Witnesses:
M. C. BRAINERD,
R. WILSON.